June 19, 1951 F. R. MILSOM 2,557,194
AMPLIFIER SYSTEMS FOR ALTERNATING VOLTAGES
Filed Nov. 23, 1948
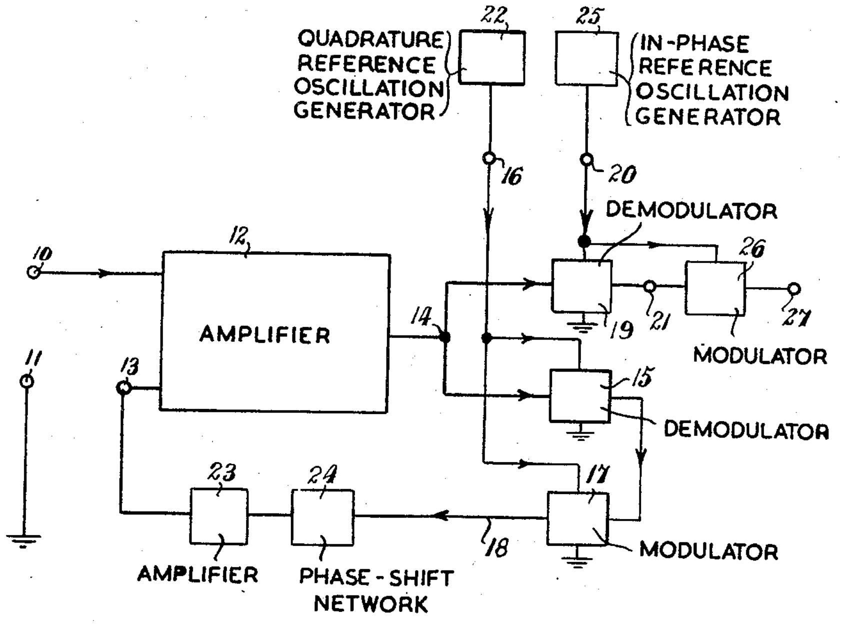
INVENTOR
Frederick Roger Milsom
By Richardson and David
his Attys.

Patented June 19, 1951

2,557,194

UNITED STATES PATENT OFFICE 2,557,194

AMPLIFIER SYSTEM FOR ALTERNATING VOLTAGES

Frederick Roger Milsom, Boreham Wood, England, assignor to S. Smith and Sons (England) Limited, London, England, a company of Great Britain, and Furzehill Laboratories Limited, Boreham Wood, England, a company of Great Britain Application November 23, 1948, Serial No. 61,630
In Great Britain December 1, 1947

5 Claims. (Cl. 332—31)

This invention relates to amplifier systems for alternating voltages of substantially constant frequency, but varying amplitude. It is concerned with amplifier systems which are required to amplify selectively that component of an input signal which has a predetermined phase relationship with a given constant signal in comparison with that component of the input signal which is in phase quadrature with respect to the first-named component. These two components will be referred to as the "in-phase" and "quadrature" components respectively.

It will be assumed that the given constant signal is in phase or in anti-phase with the said in-phase component and can act as what will be referred to as an "in-phase reference oscillation." This is because if the given constant signal is not in phase or in anti-phase with the said in-phase component, there can readily be generated from the constant signal, by well-known phase-shifting devices, an in-phase reference oscillation which is in phase or in anti-phase with the said in-phase component. Moreover there can be generated, by the use of other well-known phase-shifting means, a further constant signal which will be referred to as a "quadrature reference oscillation" which is in phase quadrature with respect to the in-phase reference oscillation.

The purpose of the present invention is therefore to provide an amplifier system which gives a much smaller response to the component of its input signal which is in phase with a quadrature reference oscillation than to the component of its input signal which is in phase with an in-phase reference oscillation.

According to the present invention there is provided an amplifier system having associated with the output circuit of an amplifier a phase-selective device for selecting the component of the output produced by amplification of the quadrature component of the input signal and means for feeding this selected component, either directly or after further amplification, back to the input of the amplifier in such a sense as to oppose the said quadrature component of the input voltage. The selection is preferably effected with the aid of a quadrature reference oscillation. Moreover amplification in the said amplifier of the in-phase signal component may be favoured by selective means operating under the control of an in-phase reference oscillation.

One embodiment of the invention will be described by way of example with reference to the accompanying drawing. In the drawing an input signal, assumed to contain a desired in-phase component and a quadrature component which is to be rejected, is applied between terminals 10 and 11, terminal 11 being earthed. The terminal 10 constitutes one terminal of an amplifier 12 whose other input terminal is shown at 13. The amplifier may be of any convenient type. The output terminals of the amplifier are 14 and earth. The terminal 14 is connected to a demodulator 15 to which is applied from terminal 16 a quadrature reference oscillation generated by a generator 22. The output of the demodulator 15 is connected to a modulator 17 to which is applied a quadrature reference oscillation from the terminal 16. The output of this modulator at 18 is connected to the terminal 13 of the amplifier 12.

The output of the demodulator 15 will be a voltage of amplitude which varies relatively slowly in accordance with the variation of amplitude of the quadrature component of the input signal. The demodulator 15 includes such filter circuits as may be necessary to remove from the output thereof any voltage component at the frequency of the original input or at harmonics of this frequency. The modulator 17 serves to produce between the line 18 and earth a quadrature component varying in amplitude in the same manner as the quadrature component at the input of the amplifier. There may be provided in the line 18 any required amplifying or phase-shifting devices such as are indicated in the drawing at 23 and 24 respectively, the phase-shifting network 24 being required only if the phase shift through the amplifier 12 is other than zero or 180° since the feed-back can be taken to either of the amplifier input terminals 10 or 13 according to the sense of the voltage on the line 18. In any case the arrangement is such that the voltage fed back along the line 18 is in such a sense as to oppose the quadrature component of the input signal applied between terminals 10 and 11 and to have substantially equal amplitude to that of this quadrature component.

The terminal 14 is also connected to a further demodulator 19 where it is mixed with an in-phase reference oscillation applied at terminal 20 from a generator 25. The output of this demodulator 19 between terminals 21 and earth will be a voltage varying with the amplitude of the in-phase component of the signal applied between terminals 10 and 11 and substantially free from any voltage dependent upon the amplitude of the quadrature component of the input signal. This treatment of the in-phase component provides a favouring of the desired in-phase component in comparison with the quadrature phase component additional to that provided by the selective feed-back. Where it is desired that the output voltage should have the same form as the in-phase component of the input signal, the voltage at the terminal 21 may be applied to a further modulator 26 where it is mixed with an in-phase reference oscillation from the generator 25 and the output is taken at terminal 27.

That the negative feed-back of the quadrature component provides the required selective amplification may be explained as follows. It will be assumed that the in-phase reference oscillation at 20 has the time-factor cos pt and that the amplifier introduces no phase shift. Then the signal applied at the terminal 10 which it is required to amplify has the form E cos pt and the signal applied at the same terminal which it is required to reject is of the form e sin pt, where E and $e$ vary slowly with time in comparison with cos pt. It will further be assumed that the gain of the said amplifier, without feed-back, is A (A being either greater or less than unity although generally greater than unity), and that the multiple of the quadrature component of the output of the amplifier which is fed back negatively to the input of the amplifier along the line 18 is $r$ and has an amplitude $v$ in the output of the amplifier. Then the voltage at the input of the amplifier will be equal to E cos pt$+(e-rv)$ sin pt and the output voltage of the amplifier is AE cos pt$+A(e-rv)$ sin pt. However, since $A(e-rv)=v$, therefore $v=e/[r+1/A]$ and the ratio between the in-phase and quadrature components is increased by the amplifier and the feed-back circuits by the factor $A(r+1/A)$. By making the magnitude of A and/or $r$ large, this factor can be made large.

The modulators and demodulators referred to may be of any convenient type, such for example as the well-known "ring" modulators.

I claim:

1. An amplifier system for alternating voltages of substantially constant frequency and varying amplitude, wherein there co-exist in-phase and quadrature-phase components, said amplifier system comprising an amplifier having provided input terminals for the simultaneous application thereto of said multi-componential alternating voltages, whereby there are produced output voltages having in-phase and quadrature-phase components in the output of said amplifier, a phase-selective device associated with the output of said amplifier to select said quadrature ouput component from said output, and means to feed at least part of said selected quadrature output component to the input of said amplifier, in phase opposition to said quadrature-phase input component, said amplifier system thereby acting to yield an output voltage in which the ratio between in-phase and quadrature-phase components is greatly increased over the corresponding ratio in the input voltage.

2. An amplifier system according to claim 1, wherein said phase-selective device comprises a generator of a quadrature-phase reference voltage which is in phase with said quadrature-phase output voltage, a demodulator connected both to said amplifier and said generator, whereby there are simultaneously applied at least a part of said quadrature-phase reference voltage and said quadrature-phase output voltage to said demodulator, so as to generate at the output thereof a fluctuating voltage varying in amplitude in accordance with changes of amplitude of said quadrature-phase component, a modulator, and means for simultaneously applying thereto at least part of said quadrature-phase voltage from said generator and said fluctuating voltage from said demodulator.

3. An amplifier system for increasing the amplitude ratio of an in-phase component of voltage applied to the input thereof in comparison with a component of the applied voltage which is in phase quadrature with respect to said in-phase component, said system comprising an amplifier having input terminals for said applied voltage and output terminals for delivering an output voltage, an oscillation generator to generate oscillations of the frequency of said applied voltage and in fixed phase relation to said applied voltage, a demodulator, a modulator, means for applying oscillations from said generator and from the output of said amplifier to said demodulator, means for applying the output of said demodulator to said modulator and means for applying voltage from the output of said modulator to the input of said amplifier.

4. An amplifier system for increasing the amplitude ratio of an in-phase component of voltage applied to the input thereof in comparison with a component of the applied voltage which is in phase quadrature with respect to said in-phase component, said system comprising an amplifier having input terminals for said applied voltage and output terminals for delivering an output voltage, a first and a second oscillation generator to generate respectively in-phase and quadrature-phase reference oscillations of the frequency of said applied voltage and in quadrature relatively to one another, a first and a second demodulator, a modulator, means for applying said quadrature-phase reference oscillations and at least part of said output voltage to be mixed in said first demodulator, means for applying voltage from the output of said first demodulator and said quadrature-phase reference oscillations to be mixed in said modulator, means for feeding at least part of the output from said modulator to said input terminals and means for applying at least part of said output voltage and said in-phase reference oscillations to be mixed in said second demodulator.

5. An amplifier system according to claim 4, comprising a second modulator and means for applying the output from said second demodulator and said in-phase reference oscillations to be mixed in said second modulator.

FREDERICK ROGER MILSOM.

REFERENCES CITED

The following references are of record in the file of this patent:

UNITED STATES PATENTS

| Number | Name | Date |
|---|---|---|
| 2,176,587 | Goldstine | Oct. 17, 1939 |